Fig. 3.

United States Patent Office 3,541,891
Patented Nov. 24, 1970

1

3,541,891
INDEXING MECHANISM
Charles E. Sweet, 7143 S. Riverside,
Marine City, Mich. 48039
Filed Aug. 8, 1968, Ser. No. 751,187
Int. Cl. B23b 29/24
U.S. Cl. 74—822
22 Claims

ABSTRACT OF THE DISCLOSURE

Apparatus for imparting progressive displacements, to a device, such as successive angular movements to a rotatable work table. A cam roll and slide structure is reciprocated generally radially of the table axis. Its cam roll applies pressure to the cam slot of a reverse cam plate to oscillate the latter through the displacement angle about the table axis. It also actuates a pair of releasable dogs or pins engageable with the table, one to rotate the table through the displacement angle concurrently with one directional movement of the cam plate and the other to hold the table stationary during return movement of the cam plate, engagement and disengagement of the dogs occurring whilst the cam plate is stationary and each dog being engaged with the table before the other is disengaged therefrom.

BACKGROUND OF THE INVENTION

The invention relates to indexing apparatus for imparting intermittently and progressively successive predetermined displacements to a straight line or rotatable work table or device or group of devices. It is particularly concerned with apparatus for effecting successive angular displacements of a rotatable work table in a manner overcoming the defects in known devices such as those utilizing the poor time curve of the common Geneva motion exemplified in the patent to Carpenter 2,757,559, the weakness and limitation of the conventional cam and roller follower mechanism exemplified in the patent to Opperthauser et al. 3,153,355, the complexity and expense of the cam and pinion-segment type illustrated in the patent to Hautau Re. 24,700, and the harsh and erratic action of the rack and pawl mechanisms evident in the patent to Ferris, No. 1,578,232.

SUMMARY OF THE INVENTION

An object of the invention is to provide an indexing apparatus or mechanism of the above type that is direct, fast, and positive, and which is relatively inexpensive to produce.

Another object is to provide a mechanism as in the preceding object wherein a cam plate having a cam slot of "reverse" form is given movement by the pressure of a reciprocating cam roll causing the cam plate to be operable to and fro or back and forth in a predetermined path or oscillate or otherwise move about a fixed axis, as opposed to conventional cam and roller arrangements where motion is imparted to a cam roll by movement of the cam plate.

A further object is to provide a mechanism as in the preceding objects wherein the cam plate includes a roll actuated releasable dog or drive member interengageable with means, such as a recess or lug associated with the work table for positively advancing or indexing the table during reciprocation or oscillation of the cam plate.

Still another object is to provide a mechanism as in the preceding object including a second dog, shot pin, or latch member, actuated by means comprising the reciprocating cam roll and its carrying means, for holding the table stationary whenever the first mentioned dog is disengaged therefrom.

2

A specific object is to provide an indexing mechanism comprising a rotatable work table, a power driven slide, a cam roll reciprocated by the slide in a path radially of the table axis, a cam plate swingable about the table axis, a reverse cam slot in the cam plate engaged by the cam roll and adapted to effect oscillation of the cam plate in response to reciprocation of the cam roll; a releasable drive dog or latch carried by the cam plate and movable along a path radially of the cam plate axis into locking engagement with and disengagement from means on the work table in response to actuation by the cam roll and a second releasable dog, latch, or shot pin, actuated by means, including the cam roll slide, for holding the work table stationary when the first dog is disengaged from the work table, said first dog being engaged before said second dog is released and said second dog being engaged before said first dog is released.

A further specific object is to provide an indexing mechanism as in the preceding object wherein the drive dog is engaged with the work table during one-half an oscillation of the cam plate and the second dog is engaged with the table during the other one-half oscillation of the cam plate.

Still another object is to provide an indexing mechanism as in the preceding objects including power motor means, for example a differential pressure fluid motor comprising a cylinder and an air or oil operated piston for actuating the cam roll slide and the cam roll it carries, control means, for instance a four way valve means for controlling differential pressure actuation of the piston, solenoid means for actuating the valve means to its predetermined control positions and further control means comprising a plurality of limit switches actuated by the cam roll slide at opposite ends of its movement and time cam means or alternatively a limit switch actuated by the work table holding dog or its actuating means and limit switch means actuated by the work performing device, for controlling the valve solenoid means so as to permit indexing of the work table and performance of work at the work table and re-indexing of the work table in a continuous pattern with maximum time for work.

A further object is to provide an indexing mechanism as in the preceding object wherein the work performed at the indexed position of the work table is carried out during the second one-half oscillation of the cam plate.

These and other objects of the invention will appear from the following description of an illustrative embodiment of the invention.

BRIEF DESCRIPTION OF THE DRAWINGS

In the drawings:

FIG. 6 is a sectional elevational view taken at 6—6 of

FIG. 3 showing the cam roll and slide, a part of the table holding dog releasing elements, and the lubrication pump and its actuator and conduit system for effecting lubrication of the table and cam plate outer support ways or rings.

Although the principles of this invention are applicable to many types of machines and to linear as well as rotary indexing they have been shown and will be described for purposes of illustration and not limitation as applied to an eight station rotary index table.

Figure 3:
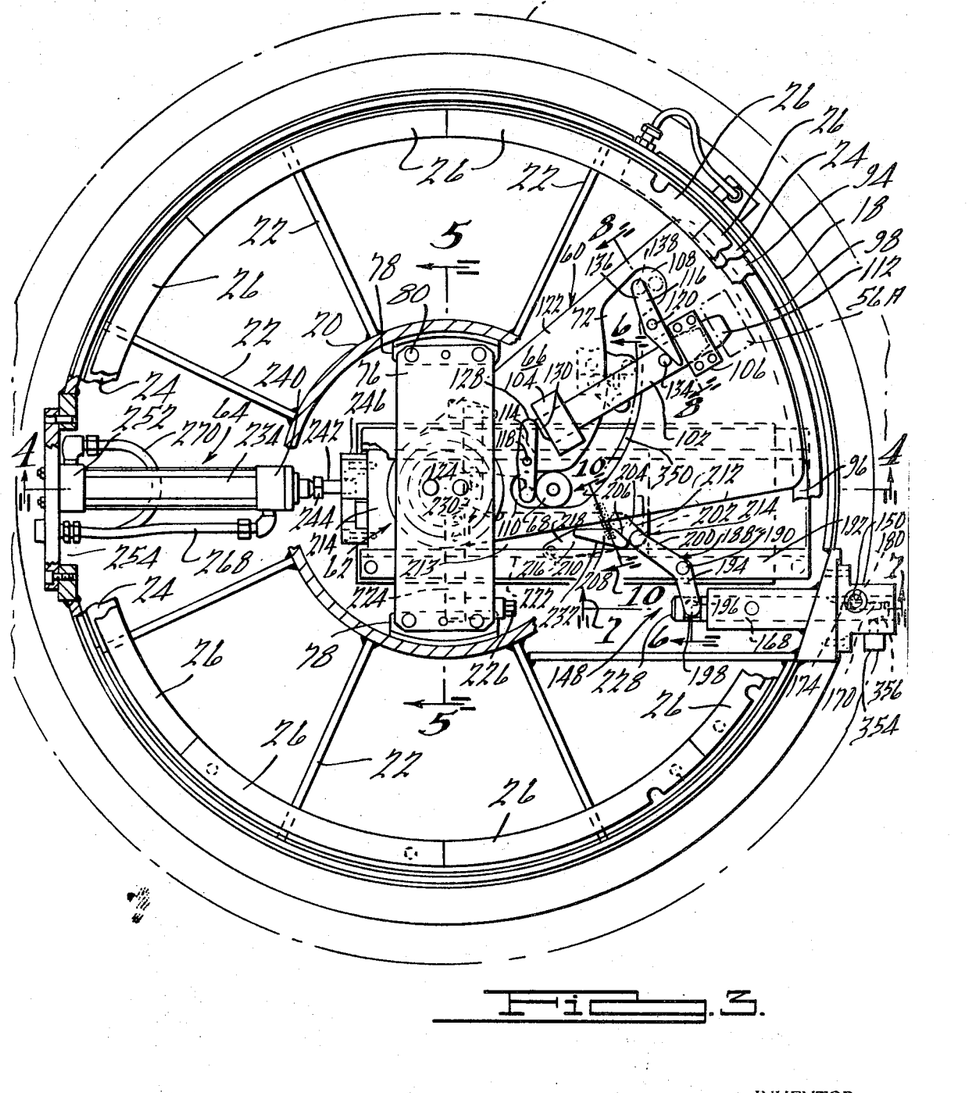
FIG. 3 is a plan view taken at 3—3 of FIG. 2 with the index table removed and parts broken away.

Referring to the drawings the rotary index table to which the principles of the present invention have been applied comprises a base generally designated by the numeral 10 on which is rotatably journalled and supported a circular work table 12 which can be of any suitable diameter and which has a flat top surface 14, for receiving and mounting machine tools or work holding devices (not shown) of known character for example drilling tools or fixtures for holding work pieces to be drilled. The base 10 is composed of a bottom wall 16, an outer upstanding cylindrical shaped side wall 18 and an inner upstanding cylindrical shaped wall 20 which interconnects with the outer wall 18 through a plurality of radial reinforcing ribs 22, six in number being shown as seen in FIG. 3. The side wall 18 includes an annular inwardly projecting table supporting ledge or flange 24 adjacent the top of the wall 18. It supports end to end a plurality of flat arcuate shaped segments 26, preferably of bearing bronze material and preferably eight in number, each 45 degrees. Together these segments provide a ringlike wear or bearing surface for seating the work table and over which it may slide. The under face portion of the table in the region 28 adjacent the segments 25 is preferably flame hardened to provide an improved wear surface. (See FIG. 7.) The undersurface of the table 12 is also grooved as at 30 to provide a channel to receive with clearance the upper edge portion 32 of the wall 18 to form a dirt and chip inhibiting seal therewith.

The work table 12 is rotatably journalled to the inner wall 20 of the base 10 through a ball bearing generally designated by numeral 34 the outer race 36 of which is received in an annular recess 38 of the table and held there by a cylindrical retainer 40 which has an upstanding portion 42 extending with clearance into a dirt seal forming groove 44 of a cap or central stationary table 46 seated in and on and overlying a flange or shouldered portion 47 at the inner end of the inner wall 20 of the base and held thereto by screws 48. The inner race 50 of bearing 34 is supported on a shouldered sleeve 52 secured as by welding to the wall 20 and is held in position by a cylindrical spacer 54 carried by the sleeve and extending between the bearing inner race and the stationary central table 46.

The rotatable table 12 carries on its under side within the base outer wall 18 a plurality of locking or driving blocks or lugs, eight being shown (FIGS. 1 and 4) consecutively numbered 56A to 56H respectively equally circumferentially spaced and radially positioned each having a tapered outwardly converging tooth slot 58 in a common plane paralleling the table 12. Through the medium of the blocks 56A to 56H the table 12 may as best seen in FIGS. 3 to 6 be progressively rotated by the combined oscillatory reverse cam and dog means generally designated by the numeral 60, actuated by a roll and slide mechanism generally referred to by the numeral 62 the latter in turn driven by power motor or prime mover means generally designated by the numeral 64 between in (start) and out (stop) positions.

The combined cam and dog means 60 actuated by the roll and slide means 62 is a particular feature of the invention in that rather than imparting motion to a roller follower the cam or cam plate 66 of this mechanism which as seen in FIG. 3 is of a 30° sector shape, receives motion or drive from a cam drive member or roller 68 causing the cam to oscillate about the axis 70 of the table through an angle and at a rate determined by the shape of its cam groove or slot 72. In the exemplified structure the angular motion is the angular distance between two adjacent locking blocks, for instance blocks 56A and 56B or 45 degrees. In order to provide a smooth oscillatory action of the cam plate 66 it is preferably pivoted directly on the axis 70. Thus the inner end of the cam plate 66 is journalled in the general plane of the cam roll or roller 68 by a ball bearing 73 suspended from a cylindrical stud or post 74 in turn secured to a bracket or bridge piece 76 extending transversely of the slide mechanism 60 and supported on opposite lugs 78 (FIGS. 3 and 5) projecting inwardly from the inner wall 20 of the base 10 to which it is secured by fasteners 80. A washer 82 secured to the stud 74 by screw 84 retains the inner race of bearing 72 on the stud 74 and an annular retainer 86 holds the outer race of bearing 72 in a bore 88 of the cam plate 66. To maintain the cam plate 66 in a fixed plane during its oscillations about the axis of the table 12 the outer edge portion 90 is made to slide in a 120° arcuate guideway generally designated by numeral 92 composed of top and bottom plates 94, 96 spaced apart by spacer 98 and secured to the underside of the base ledge 24 by screws 100.

The combined cam and dog means 60 also includes a flat slidable drive dog or latch 102 journalled in bearing blocks 104, 106 on the top side of the cam plate 66. The latch 102 is arranged to slide radially of the table and cam swing axis 70 crossing the cam slot 72 intermediate its radial end portions 108, 110 and in the plane of the table drive blocks 56A to H. Its outer tapered end 112 is adapted to slidably interengage and interfit with the complementary slot or recess 58 of the table locking blocks 56A to H with which the dog is brought into radial alignment as hereinafter described in operation of the device.

The dog 102 is rendered operable between engaged and disengaged positions (shown in phantom in FIG. 3) by bell cranks or levers 114 and 116 which pivot about suitable shouldered studs 118, 120 respectively, secured to top face 122 of the cam plate 66 and ride over that face. The lower end of lever 114 (FIG. 3) carries a roller 124 which depends into the cam slot 72 in the inner radial portion 110 of the latter where it may be engaged by the cam roll 68. A stud 126 mounts the roller 124 to the lever 114. The other or upper end 128 of lever 114 is adapted to engage the lower end 130 of dog 102 to effect engagement of the latter with one of the drive blocks 56A to H in response to actuation of lever 114 by cam roll 68 during return of the slide mechanism 62 to its in or starting position (FIG. 15) whereby to prepare table 12 for its next indexing movement by cam 66.

Figure 8:
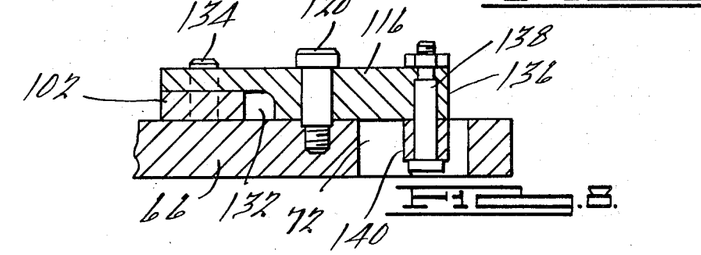
FIG. 8 is a sectional elevational view taken at 8—8 of FIG. 3 showing the cam plate supported table drive dog and releasing means.

The lower end of crank or lever 116 is undercut at 132 (see FIG. 8) to overly the dog 102 and be engageable with a pin 134 carried by the latch 102 to effect disengaging operation of the dog 102 from block 56A in response to actuation of the lever 116 by the cam roll 68 during movement of the slide mechanism 62 to its "out" or stop position. (FIG. 13) As in the case of lever 114 the lever 116 carries at its upper end 136 (see FIG. 8) a stud 138 which mounts a roller 140 the latter depending into the cam slot 72 in the radial portion 108 thereof where it may be engaged by the cam roll 68 during the final movement of the slide 214 after indexing is completed. With the table 12 now indexed 45 degrees and the dog 102 disengaged the cam plate 66 may now be returned to its starting position by return movement of the slide mechanism 62 to its starting position where the dog 102 is engaged with the next drive block 56B by action of the cam roll 68 on lever 114 and the mechanism is ready for the next indexing operation.

Figure 4:
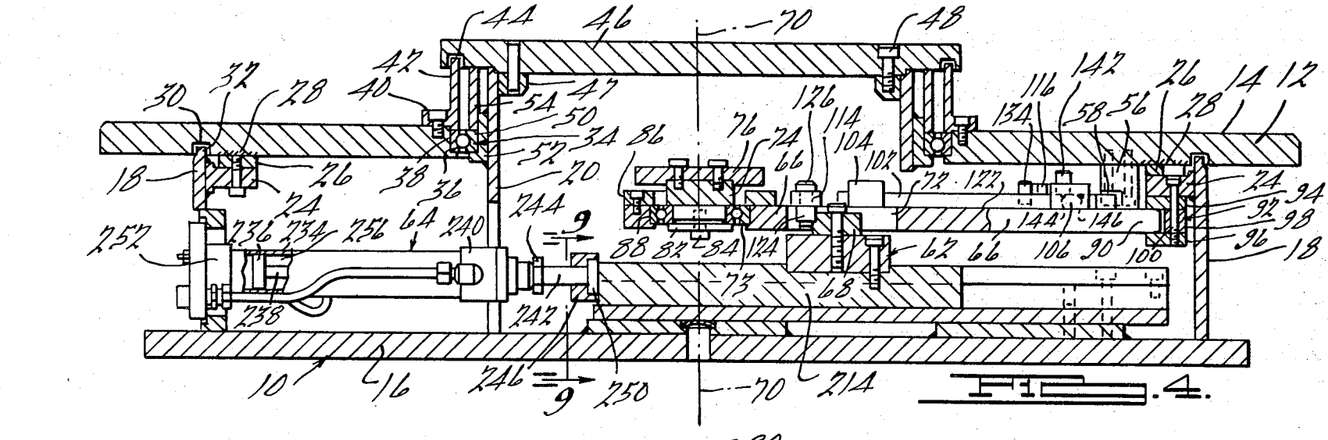
FIG. 4 is a sectional elevational view of the table and indexing mechanism taken on the line 4—4 of FIG. 3.
Figure 5:
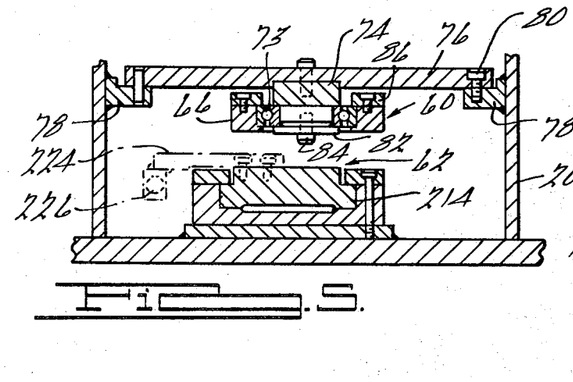
FIG. 5 is a sectional elevational view taken at 5—5 of FIG. 3 showing the cam plate journal and support, and the cam roll slide and the engaging actuator for the table holding dog.

During oscillating movement of the cam plate 66 the dog 102 is retained in its engaged and disengaged positions respectively, by a conventional spring pressed detent 142 carried in the dog bearing block 106 (see FIG. 4). The detent engages in a groove or depression 144 when the dog 102 is engaged with a drive block and in a groove or depression 146 when the dog 102 is disengaged.

Figure 1:
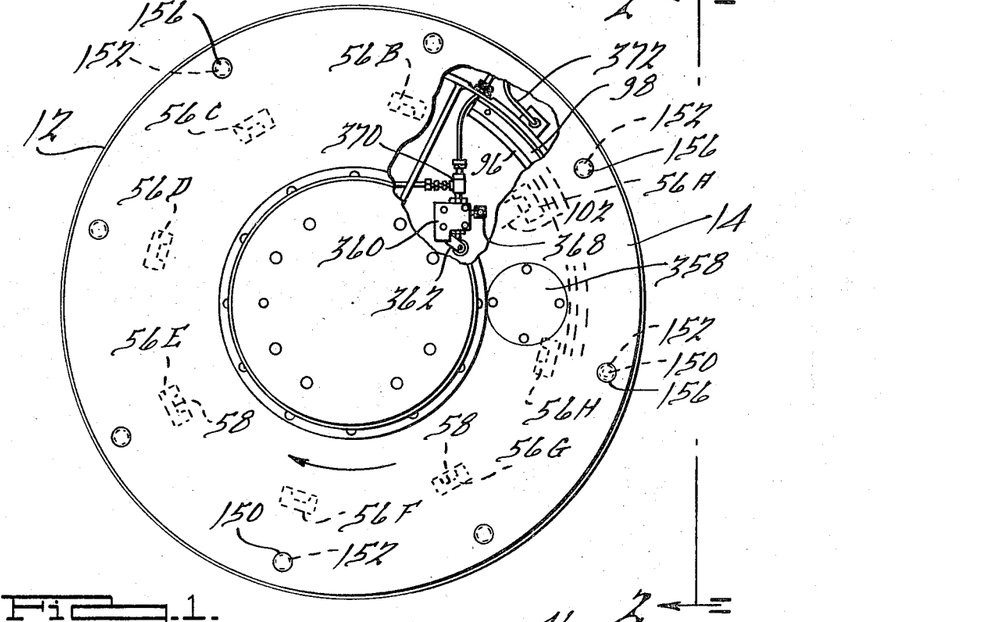
FIG. 1 is a plan view of an index or work table for supporting work or work performing tools and the like (not shown), which figure is partially broken away to show portions of the lubricating means and showing other parts of the indexing mechanism underlying the work table.
Figure 2:
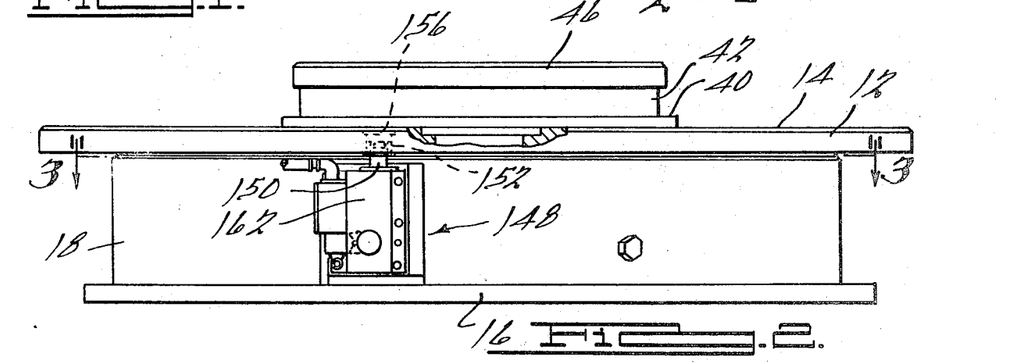
FIG. 2 is a side elevational view, taken in the direction of the arrows 2—2 in FIG. 1, and partially broken away to show the cam roll access opening and cover and showing a portion of the table holding dog or shot pin and associated elements.
Figure 7:
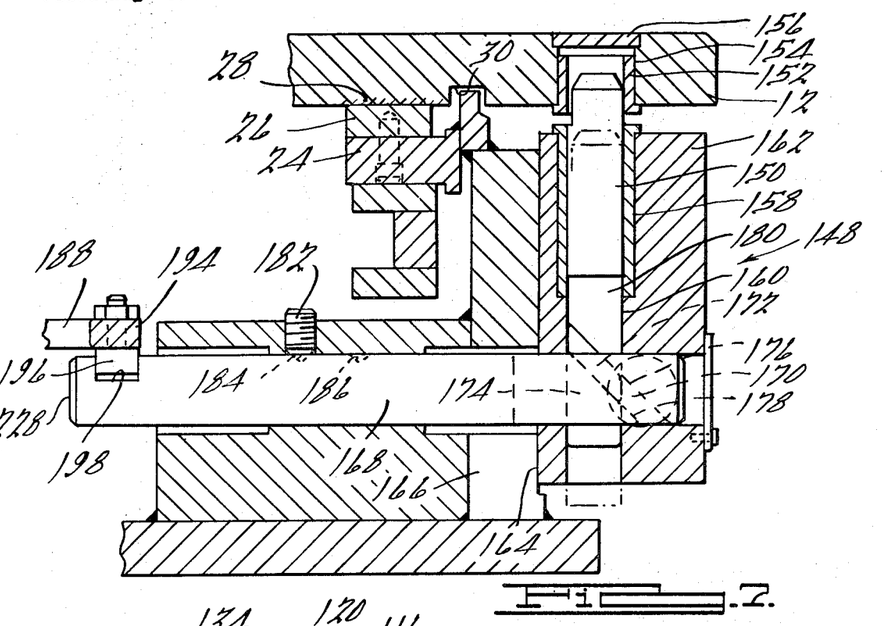
FIG. 7 is a sectional elevational view taken at 7—7 of FIG. 3 showing the table holding dog, latch, or shot pin, interengaged with the table and showing some of the actuating elements for this pin.

A further feature of the invention is the locking means generally denoted by numeral 148 and comprising the vertical sliding lock bolt, dog, or shot pin 150 which is operable to hold the table 12 stationary in each indexed position during the time interval when the dog 102 is being disengaged from the table block 56A after indexing and is subsequently engaged with the next drive block 56B when the cam plate 66 is returned by the cam roll to its starting position for the next indexing operation. Thus as best seen in FIGS. 3 and 7 the bolt 150 is slidable between a position seen in FIG. 7 where it is engaged in a hollow bushing 152 pressed into a bore 154 in the table 12 and a disengaged position, shown in phantom in FIG. 7, where it is disengaged from the table 12. In the instant embodiment there are eight bushings 152 on the table spaced 45 degrees apart and corresponding to the number of drive blocks 56A to H and indexing positions or operations needed to complete one revolution of the table 12. Each of the bores 154 is closed at its upper end by a disc or button 156 to prevent chips or dirt accumulating in the bushings. As seen in FIG. 1, each bushing 152 is located radially outwardly of one of the drive blocks 56A to H. Moreover, the bolt 150 is engaged in a bushing 152 spaced clockwise in FIG. 1, from the block 56A with which the dog 102 is engaged, by an angle of 45 degrees.

Reverting to FIG. 7, the lock bolt 150 is slidable in a sleeve 158 pressed into a through bore 160 in a block 162 secured to face 164 of the side wall portion of base 10. The bolt 150 is raised and lowered by a horizontal sliding bar or cam rod 168 whose axis is offset in the plane of the rod from the axis of bolt 150 as seen in FIG. 3. To this end the rod 168 is provided with a 45 degree cam faced slot 170 which interengages a complementary 45 degree tooth 172 on the bolt 150. The cam slot 170 is formed on a flat face 174 of the rod 168 and bottoms on the axis of the rod 168 as seen in FIG. 3. The cam slot 170 is defined by an upper cam face 176 and a lower cam face 178 as seen in FIG. 7. The tooth 172 projects from a face 180 formed on the axis of the bolt 150. In the position shown in FIG. 7, the bolt 150 is engaged with the table 12 by action of the cam face 178 of the sliding rod 168 which has been shifted to the right in this figure. The cam face 178 acts upon the tooth 172 to raise the bolt 150 to the position shown. The rod 168 is held in the position shown by a conventional spring detent 182 which engages in a recess 184 on the rod 168. When the rod 168 is shifted to the left the cam face 176 of rod 168 acts upon the tooth 172 of bolt 150 to disengage it from the table 12 and lower the bolt to the position shown in phantom in FIG. 7. The rod 168 is held in this position of the bolt 150 by engagement of detent 182 with a further recess 186 on the rod 168.

Figure 6:
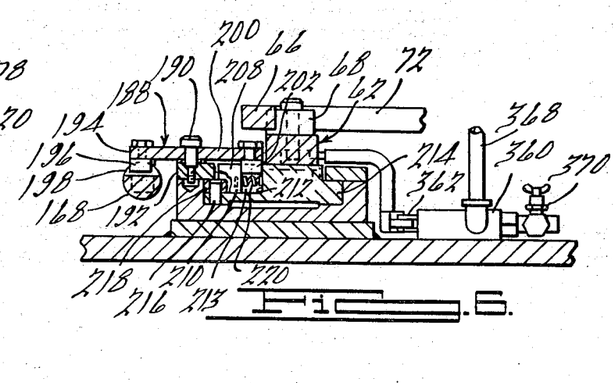

As seen in FIGS. 3 and 6, the rod 168 is actuated by a bell crank lever generally designated by the numeral 188, and pivoted on a stud 190 secured to a stationary guide rail 192 of the slide mechanism 62. One leg 194 of the crank carries a cam roller 196 which engages in a slot 198 of the rod 168 and the other leg 200 of the crank carries a similar cam roller 202 which in the FIG. 3 position is engaged in a camway 204 formed by a cam face 206 on the outer side of the head portion 208 of a spring biased arm 210 and a cam face 212 formed forwardly on the slide 214 of the mechanism 62 by a recessed portion 213. A pin 216 mounted on the slide 214 adjacent the forward end thereof provides a pivot for the base portion 218 of arm 210 which base portion underlies the rail 192 as seen in FIG. 6 and is thus held in position in conjunction with the pin 216. A compression spring 220 shown in FIGS. 3 and 6 acts to bias the arm 210 in a clockwise direction on pin 216 such that the head portion 208 of arm 210 abuts the inner edge 222 of rail 192.

The movable slide 214 also carries an outboard arm 224 adjacent its rearward end which arm carries an adjustable abutment member 226 which is adapted, during movement of the slide to the right in FIG. 3, to abut the left end 228 of the rod 168 in FIG. 3 when the bolt 150 is disengaged, to effect its re-engagement with the table 12. It will be noted that as the slide 214 moves forwardly (to the right in FIG. 3) the cam roller 202 of crank 188 is carried up the camway 204 causing a clockwise rotation of the crank 188 and operation of the rod 168 to the left to effect disengagement of the bolt 150 from the table 12. When the roller 202 reaches the phantom position in FIG. 3 it strikes a horizontal wall 230 of the recess 213 on the slide 214. At this point the bolt 150 is fully disengaged. The roller then continues to ride along the wall 230 until the head portion 208 of arm 210 completely passes it at which time the abutment member 226 on the slide projection 224 strikes the left end 228 of the rod 168 and continued forward movement of the slide and abutment produces shift of rod 168 to the right to effect re-engagement of the bolt 150 with the table. During this operation the crank 188 is rotated in a counterclockwise direction so that its roller 202 is now in line with the lower or inner side 232 of the head portion 208 of arm 210. Accordingly on the return or rearward movement of slide 214 this lower side 232 of arm 210 will strike the roller 202 and the arm 210 will cam past the same, the roller causing the arm 210 to lift and compress the spring 220. When the head portion 208 of arm 210 is past the roller 202 the spring 220 will bias the arm 210 to return to its position shown in FIG. 3 and the roller 202 of crank 188 will be in its position shown in FIG. 3. During this time the bolt 150 remains engaged with the table 12.

Figure 9:
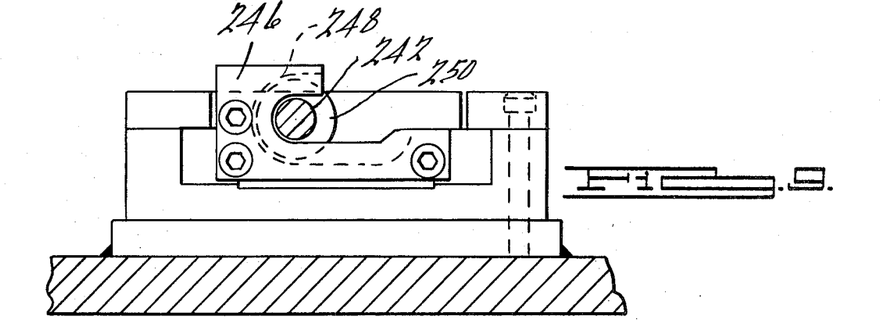
FIG. 9 is a sectional elevational view taken at 9—9 of FIG. 4 showing the power motor-roll slide connection.
Figure 10:
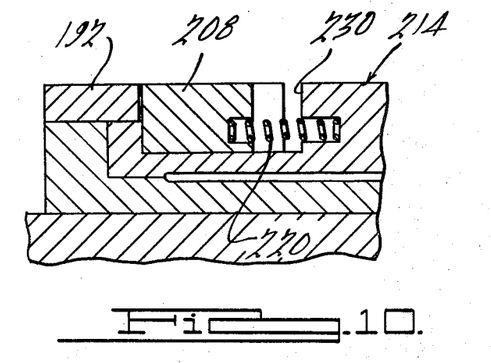
FIG. 10 is a sectional elevational view taken at 10—10 of FIG. 3 showing the spring biased cam lever portion of the camway for actuating the table holding dog release means.

As previously described the roll and slide means 62 is reciprocated by power motor means 64. The latter may take many different forms, for example, an electrical motor driven crank or cam (not shown) but preferably comprises a differential pressure operated fluid motor using oil or air. Specifically shown is a double acting oil actuated hydraulic motor comprising a stationary, closed ended hollow fluid casing or cylinder 234 containing a piston 236 having a piston rod 238 which projects through a port block 240 forming the right end of the cylinder in FIG. 3. The piston rod 238 connects with the slide 214 by a driver connector 242 threadedly secured to the end of the piston rod 238 and locked thereto by a nut 244 and secured to the slide by a retainer 246 having a C-shaped undercut groove 248 (see FIG. 9) for receiving the head 250 of the driver connector 242. The left end of cylinder 234 is formed with a port block 252 which also mounts the cylinder 234 to the upstanding side wall 18 of the base 10, the cylinder projecting radially inwardly through an opening 254 in the wall and in alignment with the slide 214. The ports of the blocks 240 and 252 open into the cylinder cavity or chamber 256 of the cylinder at points beyond the extreme positions of the piston 236 such that oil under pressure may be fed to the chamber through one port while the other is vented and vice versa so that the slide 214 may be reciprocated. In order to control feed of pressure fluid to the cylinder 234 there is provided an oil tank or reservoir 258 (see FIGS. 11 to 15) which connects with a motor driven pump 260 of any suitable kind. The pump delivers oil under pressure through a conduit 262 to a four way control valve 264 having a movable port selector 266. End conduits 268, 270 connect the valve with the port blocks 240 and 252 respectively of the cylinder 234 and a central conduit 272 returns vented fluid to the tank 258. The conduit 262 has two branches 274, 276 internally of the valve 264. The port selector has two longitudinally spaced annular grooves 278, 280. The grooves 278, 280 are of such length and positioning relative to the valve conduits such that in one position of the port selector (see FIG. 11) the groove 278 connects the branch conduit 274 and cylinder conduit 270 so as to bring pressure fluid from the pump 260 to the left end of cylinder 234 and hence to the left side of piston 236, while the groove 280 connects the cylinder conduit 268 with the return conduit 272 so as to vent the right side of the cylinder 234 and return fluid at that side to the tank 258. In the other position of the port selector (see FIG. 13) the groove 280 connects the branch conduit 276 and cylinder conduit 268 so as to bring pressure fluid from the pump 260 to the right end of cylinder 234 and hence to the right side of piston 236 while the groove 278 connects the cylinder conduit 270 with the return conduit 272 to vent the left side of the cylinder 234 and return fluid at that end to the tank 258.

The port selector 266 of valve 264 may be actuated manually between its two positions to control operation of the indexing mechanism in which case the operator will determine the time for returning the slide 214 and cam plate 66 to their respective starting positions and the time for beginning the next indexing operation. Preferably, the mechanism will provide for power actuation of the port selector 266 and automatic control for recycling and timing the indexing operation. FIGS. 11 to 15 show one suggested form of actuation and control of the valve 264.

Figure 11:
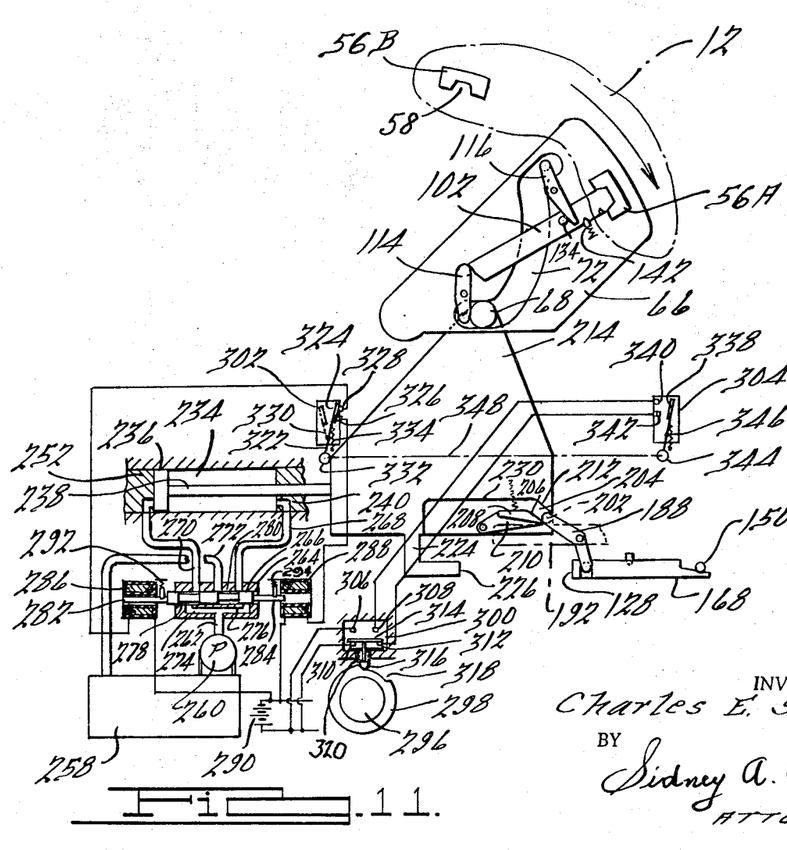
FIGS. 11 to 15 are schematic diagrams and views of one form of control system for the cam slide actuating motor, illustrating the index mechanism and controls in their several positions during a complete cycle of operation.

Thus in FIG. 11 the port selector 266 is provided with opposite iron core extensions 282, 284, which are to be acted upon by solenoids 286, 288, respectively upon energization of such solenoids. When the solenoid 286 is energized from a power source 290, the extension 282 of the port selector 266 will be sucked into the solenoid 286 and the valve selector will be positioned as seen in FIG. 11 to deliver pressure fluid to the left end of the hydraulic cylinder 234 to start an indexing operation. The port selector will be held in this position by a conventional spring detent 292 even though the solenoid 286 be thereafter de-energized. It will be noted that upon energization of solenoid 286 that the opposite core extension 284 of the port selector is withdrawn about half way from its solenoid 288. Upon de-energization of solenoid 286 and energization of solenoid 288 the relative posititons of the extensions 282, 284 in their solenoids will be reversed and the extension 284 will move to the position shown in FIG. 13 where the port selector has been actuated and positioned to deliver pressure fluid to the right end of the hydraulic cylinder 234 and cause the piston 236 to begin the return movement of the slide 214. A detent 294 will hold the port selector 266 in this shifted position upon de-energization of the solenoid 288 until the solenoid 286 is again energized.

To control energizatiton and de-energization respectively of the solenoids 284 and 286 and timing of the indexing operations there may be provided for this purpose a rotary timer 296 having a circular cam 298 adapted to actuate a control switch 300 and a pair of snap type limit switches 302, 304 actuated by the slide 214. The switch 300 has two pairs of switch contacts 306, 308 and 310, 312 which may be bridged by a contact making bar 314 carried by an electrically insulated cam follower 316 which is adapted to actuate the bar 314 between the pairs of contacts in response to rotation of the cam 298. As seen in FIG. 11, the cam follower resets in a slot 318 of the cam into which position it is biased by a spring 320. In this position the bar 314 bridges the lower contacts 310, 312. When the follower 316 is raised by rotation of the timer cam 298 it will cause the contact bar 314 to bridge the upper contacts 306, 308, which condition will prevail until the follower 316 again enters the slot 318 of the cam after a substantially complete revolution of the timer cam 298.

The snap limit switches 302, 304 are of the over-center spring type each operable between an open and a closed contact position. The switch 302 comprises an operating lever 322 carrying a contact bar 324 which will bridge the contacts 326, 328 of the switch in its closed position. The lever 322 is pivoted at 330 and has a roller 332 at its lower end for acting upon by the slide 214. An over-center spring 334 actuates the lever 322 to the fully open or closed position of the switch. In the position shown in FIG. 11 the lever 322 has been snapped to the closed position of the switch from the open position thereof. Normally, as the slide 214 approaches the switch 302 the latter will be in its open position shown in phantom in FIG. 11. The slide 214 after abutting the roller 332 will swing the lever 322 sufficiently past the vertical position to permit the spring 334 to snap the lever to the closed position of the switch.

The limit switch 304 is of similar construction to the switch 302. It includes a lever 336 carrying a contact bar 338 for bridging the contacts 340, 342 when the switch is in closed position, a roller 344 for abutment by the slide 214 and an over-center spring 346.

A link or wire 348 connects the levers 322, 336 such that when the slide 214 actuates the switch 302 to its closed position seen in FIG. 11 the switch 304 will simultaneously be operated to its open position and vice versa, when the slide 214 actuates the switch 304 to its closed position the switch 302 will be operated to its open position.

Figure 13:
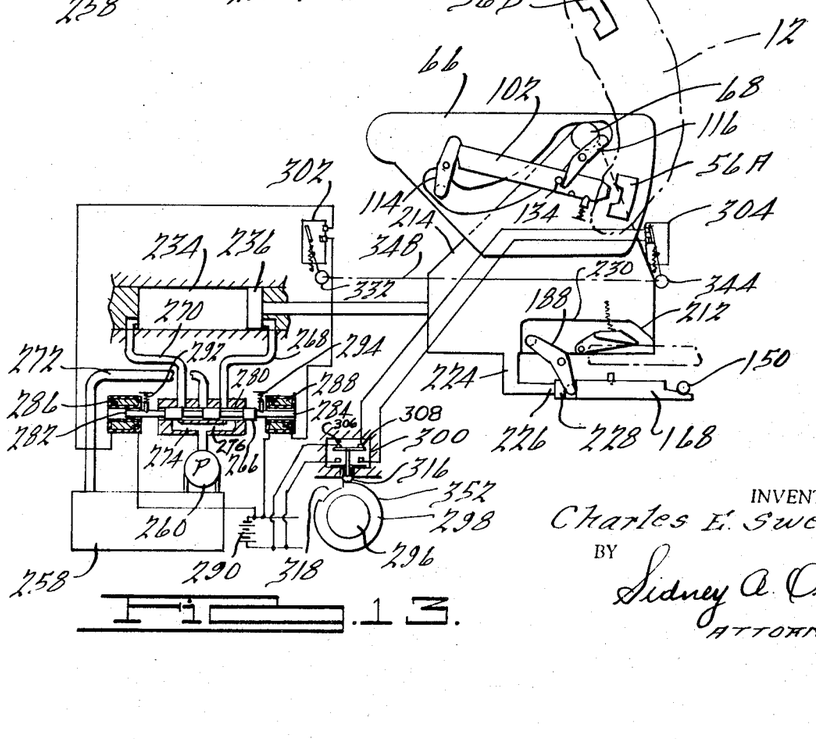

The timer switch 300 is connected in circuit with the limit switches 302, 304 and solenoids 286, 288 as seen in FIG. 11. In this arrangement when the contacts 310, 312 of the switch 300 are bridged and the limit switch 302 is closed by bridging of its contacts 326, 328, a circuit is completed from power source 290 through solenoid 286 to energize the latter and establish the port selector 266 of valve 264 in the position shown in FIG. 11 for starting indexing movement of the slide 214. On the other hand, when as seen in FIG. 13, the contacts 306, 308 of switch 300 are bridged and the limit switch 304 is closed, a circuit will be established to energize the solenoid 288 and shift the port selector 266 to the position shown in FIG. 13 to begin return movement of the slide 214.

OPERATION

Referring again to FIGS. 11 to 15 schematically showing certain elements of the indexing mechanism found in FIGS. 3 to 6 and which identify them by corresponding numerals and showing the valve and switch controls described above, the following cycle of operation will take place.

FIG. 11 shows the mechanism in starting position. The piston 236 and slide 214 are in their extreme left or rearward positions. The cam roll 68 is in the radial end portion 110 of the slide cam slot 72 and engaged with the lever 114 which has actuated the dog 102 into engagement with the drive block 56A of the table 12 where it is held by a conventional spring detent 142. The shot pin 150 is engaged in the table bushing 152 radially behind the drive block 56H (see FIG. 1) thus holding the table 12 stationary. The actuating rod 168 and crank 188 are in the positions shown in FIGS. 3 and 11 with the roller 202 of lever 188 at the mouth of the camway 204 formed by the cam face 212 of the slide 214 and the cam face 206 of arm 210. The limit switch 302 is closed and limit switch 304 is open. The timer switch 300 is in its lower position bridging contacts 310 and 312 and the plunger 316 of the switch is engaged in the slot 318 of cam 298 at the beginning thereof. The solenoid 286 is energized and has moved port selector 266 to its position to direct pressure fluid to the left end of piston 236.

As the piston 236 and slide 214 move forward, fluid is vented from the right side of piston 236 and returned to the tank 258, cam roll 68 initially moves in the radial portion 110 of cam slot 72 without effecting any motion of cam plate 66 and lever 188 swings clockwise as its roller 202 rises in camway 204 so as to actuate rod 168 to disengage the shot pin 150 from the bushing 152 behind the drive block 56H on table 12, this disengagement taking place before the cam roll 68 leaves the radial or dwell portion 110 of the cam slot 72. The dog 102 remains engaged with the table drive block 56A. As the slide 214 continues its forward movement the cam roll 68 enters the curved portion 350 of the cam slot and starts a clockwise swing of the cam plate 66 and indexing of table 12 by rotating the same.

Figure 12:
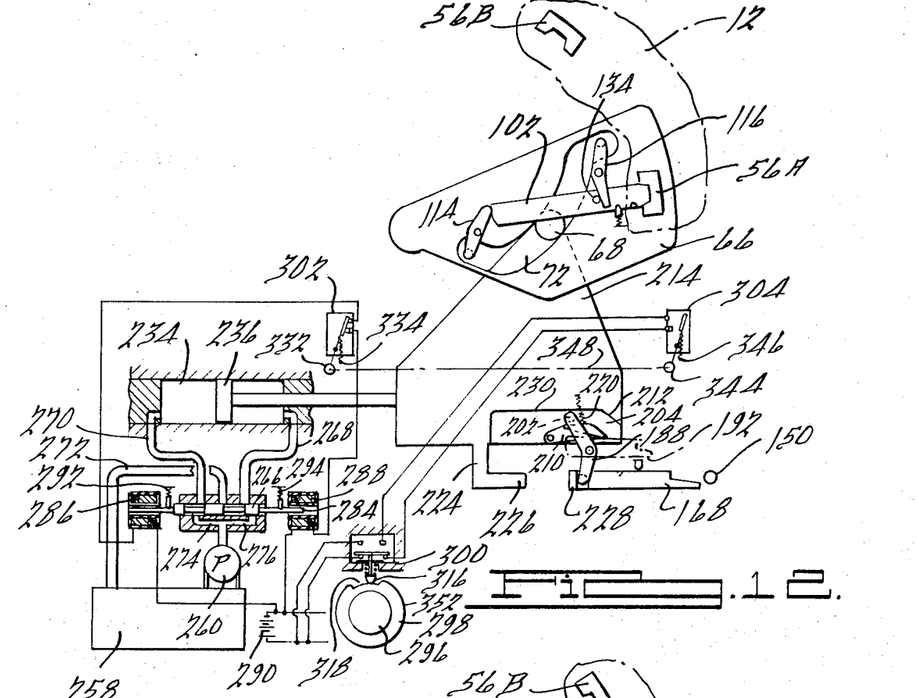

At the midposition of the piston 236 the parts will appear as in FIG. 12. The dog 102 is still engaged, the shot pin disengaged, and roller 202 of lever 188 rides along the face 230 of the slideway. The timer switch plunger 316 is near the end of slot 318 of the timer cam with its contacts 310, 312 still closed. The limit switch 302 is still closed and limit switch 304 open, and the solenoid 268 is still energized. The cam roll 68 is midway the curved portion 350 of the cam slot 72 and has swung the cam plate 66 about one-half of its full forty-five degree clockwise swing and rotated the table 12 a similar angular distance.

As the piston 236 and slide 214 approach the end of their forward motions several actions occur resulting in the relative positions of the parts as shown in FIG. 13 at the end of such movements. First, the cam plate 66 completes its 45 degree clockwise swing and has moved or indexed the table 12 a similar amount, the cam roll 68 enters the upper radial end portion 108 of the cam slot 72 where it approaches the roller 140 of dog 102 disengaging lever 116. At the same time the abutment 226 of slide projection 224 strikes the left end 228 of the shot pin actuating rod 168 moving it to the right to cam lift the shot pin 150 into engaged position with the bushing 152 of table 12 immediately behind the drive block 56A. Secondly, and after the shot pin 150 is engaged further movement of slide 214 causes the cam roll 68 to strike roller 140 of lever 116 and swing this lever clockwise to engage the release pin 134 on dog 102 to disengage the dog from the table drive block 56A. In addition the slide 214 abuts the roller 344 of limit switch 304 to throw this switch to open position and through link 348 throw the limit switch 302 to closed position thus de-energizing the solenoid 286. The valve selector 266 is nevertheless held in its position by detent 292. Thirdly, as the slide 214 completes its forward movement the plunger 316 of the timer switch 300 rises out of the cam slot 318 and rides in engagement with the outer face 352 of cam 298. This action closes contacts 306, 308 to energize solenoid 288 and shift port selector 266 to the position seen in FIG. 13, where it is held by spring detent 294. In this position pressure fluid is directed to the right side of piston 236 to start its return movement as well as return movement of the cam plate 66 while the table 12 is held stationary in its indexed position by the shot pin 150.

Figures 14, 15:
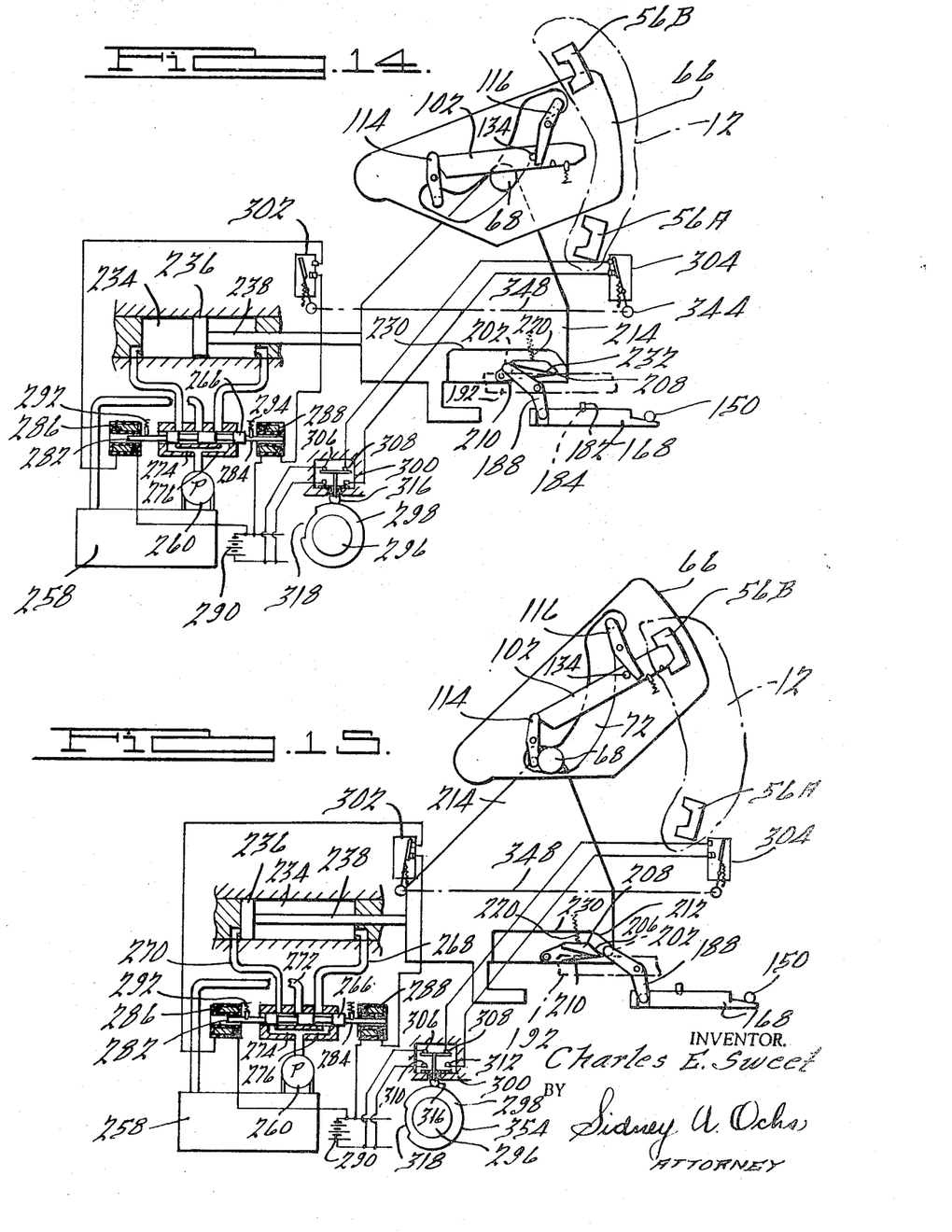

FIG. 14 shows the various elements in their relative position at the approximate midway return positions of the piston 236 and slide 214. The shot pin 150 remains engaged in the bushing 152 of table 12 behind the drive block 56A holding the table 12 stationary. The cam roll 68 is engaged with the cam plate 66 midway the curved portion 350 of the cam slot 72 and has swung the cam plate counterclockwise about one-half of the 45 degree angular return distance. The dog 102 is disengaged and midway between the drive blocks 56A and 56B where it is held by engagement of the detent 142 with the depression 146 on dog 102 (see FIG. 4), to prevent radial movement of the dog. The limit switch 304 is still closed and the limit switch 302 open. The contacts 306, 308 of the timer switch 300 are still closed and the solenoid 288 still energized. The cam follower end of plunger 316 of the switch 300 has advanced part way over the surface 352 of cam 298 by counterclockwise rotation of the timer cam 298. Moreover, the roller 202 of shot pin lever 188 is about to be engaged by the inner portion 232 of the head 208 of arm 210, the lever 188 being held stationary by engagement of the detent 182 in the slot 184 of the actuating rod 168. Further movement of slide 214 will cause roller 202 to raise the arm 210 in passing by it causing compression of the arm 210 biasing spring 220.

After leaving the FIG. 14 position, the piston 236 and slide 214 continue their movement to the return position shown in FIG. 15 which is the starting position for the next indexing operation. The cam roll 68 will have returned the cam plate 66 to its initial position thus completing one oscillation of this member since the start of the indexing operation. Moreover, the cam roll 68 will have reentered the lower radial portion 110 of the cam slot 72 and in its final movement will have engaged the roller 124 of lever 114 operating the lever clockwise to cause it to actuate the dog 102 into engagement with the table drive block 56B. The shot pin 150 will at this time still be engaged with the table 12 and the roller 202 of the shot pin operating lever 188 will have cammed past the arm 210 and the spring 220 will have returned the arm to its normal position against the guide rail 192. The arm 210 and lever 188 will be in the same positions they assumed in FIG. 11. The slide 214 will have operated the limit switch 302 to closed position and the limit switch 304 to open position, the latter action de-energizing the solenoid 288 since the timer switch contacts 306, 308 are still closed, the plunger 316 of the switch 300 being still engaged with the high or outer cam surface 354 of the timer cam 298. Although the solenoid 288 is de-energized the detent 294 will hold the port selector 266 in its position directing pressure fluid to the right side of piston 236. The solenoid 286 being also de-energized the mechanism will now be at a standstill until the timer 296 has completed one revolution of its cam 298 to effect reengagement of plunger 316 in the cam slot 318 of the cam 298. The latter action will again close the contacts 310, 312 of switch 300 causing energization of solenoid 286 and shift of port selector 266 to the FIG. 11 position. Energization of solenoid 286 is possible at this time since the limit switch 302 is also closed. It will be understood that during the interval that the timer cam 298 completes its revolution the table 12 will be stationary and held locked by both the dog 102 and shot pin 150 and any tool positioned at the indexed position of the table will be able to perform its cycle of work on a workpiece before the next indexing operation is started.

It will be noted that the cam slot 72 comprises two radial portions 108, 110 in which movement of the cam roll 68 does not produce any swing of the cam plate 66 and further comprises a curved portion connecting these radial portions. The overall shaping is that of a reverse type curve or flat S curve. It will be understood that the cam shape between the radial portions may be modified from that shown to provide any type of rapid or slow indexing rate between the extreme positions. Preferably the cam slot is shaped to minimize inertia shock in the final swing of the cam plate and table. To this end the slot is shaped to effect deceleration of the cam plate at each of the slot adjacent the radial portions of the slot and to accelerate the cam plate between the decelerating portions.

Although the radial portions of the cam slot are preferred and advantageous in that rotation of the table has been brought to a halt as the cam roll enters these portions facilitating engagement and disengagement of the dog 102 and shot pin 150 without shock, the inertia load being taken by the cam roll and slide structure, the shape of the cam slot ends may be modified from its radial character in those cases where the dog end and shot pin shaping will permit their engagement without substantial shock.

It may also be pointed out that in certain cases it may be desired to minimize the amount of time utilized for indexing and for work so that recycling of the indexing operation is as rapid as possible. In such instances it may be preferred to provide a limit switch 354 operable by a cam shaped portion 356 of the shot pin operating rod 168 to signal the controls to return the cam plate to starting position and to initiate work by the tools at the index position, and to have a second limit switch operated by the work tools upon completion of their operation to signal the start of the next indexing operation on the table.

It is also a feature of the described structure to provide one wherein the table top is clear of any projection and to inhibit the entrance of chips and dirt into the operating mechanism. Moreover provision has been made for a flush type access cover 356 on the table 12 (see FIG. 1) over an opening therein through which to inspect the cam roll 68 and quickly make a replacement when necessary. In addition, in order to provide for regular lubrication of the cam plate outer guideway rails and other essential parts, a pump 360 having an operating roller lever 362 is located on the base 10 as seen in FIGS. 1, 3, and 6. The pump is intermittently actuated by a cam 364 carried by an L shaped arm 366 mounted on and overhanging the slide 214 (see FIGS. 3 and 6). The arm positions the cam to intercept the roller end of pump lever 362 as the cam slide moves forwardly during each indexing operation. The roller arm 362 is reset by spring mean (not shown) upon return movement of the slide 214. Suitable conduit means such as the conduit 368 connects the pump to a source of lubricant and other conduit means 370, 372 carry the lubricant to the required points on the guide rails and any other place on the mechanism requiring lubrication.

From the foregoing description of the invention it will be apparent that there has been provided a novel and compact indexing mechanism that is simple, foolproof and effective. It will be obvious that changes and modifications will suggest themselves in the described apparatus and method to those skilled in the art without departing from the spirit and intent of the invention. Accordingly all such changes, modifications, and equivalents, as may come within the purview of the appended claims and the description, are contemplated.

I claim:

1. Indexing mechanism comprising a work table to receive progressive intermittent displacements, supporting means for said table, a reciprocable member, means for reciprocating said member, a cam plate having a cam slot, cam drive means operable by said member engageable in said cam slot for driving said cam plate, means supporting said cam plate for movement between two predetermined positions, said cam slot being shaped whereby said cam plate will be operable to and fro by said cam drive means between said two predetermined positions in response to reciprocation of said member, means including releasable drive means for drivingly interconnecting said cam plate and work table during part of said movement of said cam plate whereby said work table is indexed one said displacement and further releasable means for interconnecting said work table and its supporting means for holding said work table stationary during substantially the remaining portion of said movement of said cam plate, said cam slot being further shaped in portions thereof whereby said cam plate will be at rest upon engagement of said cam drive means in said portions during operation thereof by said reciprocable member and said interconnections of said releasable means being effected while said cam plate is at rest.

2. Indexing mechanism as claimed in claim 1, wherein said cam drive means comprises a cam roll and wherein said mechanism includes in addition to said means for effecting said interconnection of said releasable drive means, means for effecting release of said interconnection and wherein said said means for effecting such interconnection and release are carried by said cam plate and are operable by said cam roll during reciprocation of said reciprocable member while said cam roll is in said further shaped portions of said cam slot.

3. Indexing mechanism as claimed in claim 1, wherein said mechanism includes in addition to said means for effecting said interconnection of said further releasable means, means for effecting release of said interconnection and wherein said means for effecting such interconnection and release are operable by said reciprocable member during reciprocation of said reciprocable member while said cam plate is at rest.

4. Indexing mechanism as claimed in claim 1 wherein said reciprocable member includes means providing a cam way operably associated with one of said releasable means and wherein said shaping of said cam slot of said cam plate and the shaping of said cam way of said reciprocable member facilitate the making of said interconnections following the end of one complete to and fro movement of said cam plate and prior to starting a second movement thereof.

5. Indexing mechanism as claimed in claim 1 wherein the releasable drive means comprises a movable dog positively interengageable with the work table and operable between engaged and disengaged positions by means comprising said cam drive means.

6. Indexing mechanism as claimed in claim 1 wherein the further releasable means comprises a movable shot pin positively interengageable with the work table and operable between engaged and disengaged positions by means comprising cam and abutment means on said reciprocable member.

7. Indexing mechanism as claimed in claim 1 wherein the means for reciprocating said reciprocable member comprises a pressure differential fluid motor comprising a cylinder mounted on said work table support and a piston connecting with said reciprocable member, a source of differential pressure fluid, valve means for controlling the action of said differential pressure fluid on said piston and means for controlling said valve means.

8. Indexing mechanism as claimed in claim 1 wherein the cam slot has a generally flat S shape with the ends of the S comprising straight portions.

9. Indexing mechanism comprising a support, a rotatable work table carried by said support and adapted to receive progressive intermittent angular displacements about its axis to bring a plurality of points on said work table, each representing a station, into position relative to a point on said support for the performance of work, a reciprocable slide journalled on said support, means for reciprocating said slide between a start position and a stop position and back to said start position, a cam plate pivotally mounted on the axis of said work table, said cam plate having a cam slot, a cam roll carried by said slide and movable in a path radially of the axis of said work table, said cam roll being engaged in said cam slot and adapted to oscillate said cam plate between two predetermined positions corresponding to two adjacent stations of said work table in response to reciprocation of said slide, said oscillation consisting in swing of said cam plate in one direction between said predetermined positions in response to movement of said slide between its start and stop positions and return swing of the cam plate in the opposite direction to its starting position in response to return movement of said slide to its start position, dog means carried by said cam plate and positively engaged with said work table during swing of said cam plate in said one direction whereby the work table is rotated to index the table from one station to its next adjacent station, said dog means being in disengagement with said work table during said return swing of said cam plate, and shot pin means carried by said support and interengaging said work table and support for holding said work table from rotation during said return swing of said cam plate.

10. Indexing mechanism as claimed in claim 9 wherein said cam slot has a radially extending portion at each end thereof in one of which the cam roll moves prior to the start of an oscillation of said cam plate and after the end of an oscillation and in the other of which it moves after completing one directional swing of said cam plate and prior to starting the return swing of said cam plate and wherein said dog means is actuated by said cam roll into engagement with said work table during movement of said cam roll, in said one radial portion of said cam slot after the end of an oscillation of said cam plate and is actuated into disengagement from said work table during movement of said cam roll in said other radial portion after completing said one directional swing of said cam plate.

11. Indexing means as claimed in claim 10, including a lever carried by said cam plate which is operably intermediate said cam roll and said dog means when the latter is actuated into disengagement and including a second lever carried by said cam plate which is operably intermediate said cam roll and said dog means when the latter is actuated into engagement.

12. Indexing mechanism as claimed in claim 10, wherein said shot pin means is operable by means including said slide to interengage said work table and support prior to effecting disengagement of said dog means from said work table and to effect disengagement of said shot pin means after said dog means is engaged with said work table.

13. Indexing mechanism as claimed in claim 9 characterized in that during indexing swing of said cam plate said dog means is engaged with said work table and said shot pin means is disengaged therefrom and during return swing of said cam plate said dog means is disengaged from said work table and said shot pin means is engaged therewith and characterized further in that during a portion of the movement of said cam roll in each of said radial portions of said cam slot following said swings both said dog and shot pin means are engaged with said work table.

14. Indexing mechanism as claimed in claim 9, including a first bell crank pivotally mounted on said cam plate having one arm operable to engage said dog means to disengage the same and having its other arm extending into said cam slot adjacent one end thereof to be engaged by said cam roll to effect said disengagement of said dog means, a second bell crank pivotally mounted on said cam plate having one arm operable to engage said dog means to engage the same and having its other arm extending into said cam slot adjacent the end opposite said one end to be engaged by said cam roll to effect engagement of said dog means, releasable detent means releasably holding said dog means in its engaged and disengaged positions, a third bell crank pivotally supported by said work table support having one arm engaged with said shot pin means and having its other arm operable by cam means comprising a camway formed by an edge wall of a recess on said slide and the head portion of a spring biased arm pivotally mounted on the slide for effecting disengagement of said shot pin means, an abutment on said slide for actuating said shot pin means into engagement and releasable detent means for releasably holding said shot pin means in its engaged and disengaged positions.

15. Indexing mechanism as claimed in claim 14 wherein said shot pin means comprises a shot pin interengageable with said work table, an actuating rod for said shot pin engaged by said one arm of said third bell crank and operable by said bell crank and said slide abutment for effecting actuation of said shot pin, and cam means positively operable between said shot pin and said actuating rod for facilitating engagement and disengagement of said shot pin by said actuating rod.

16. Indexing mechanism as claimed in claim 9, wherein the means for reciprocating said slide comprises differential fluid motor means and which mechanism includes valve means for controlling said motor means and means for controlling said valve means comprising limit means operable by said shot pin means.

17. Indexing mechanism as claimed in claim 9, wherein the means for reciprocating said slide comprises pressure differential fluid motor means, and which mechanism includes valve means for controlling said motor means, and means for controlling said valve means comprising limit means operable by said reciprocable slide at each end of its movement and timer means.

18. Indexing mechanism as claimed in claim 9 including lubricating means and means on said reciprocable slide for actuating said lubricating means during movement of said slide in at least one of its directions.

19. Indexing mechanism comprising a work table to receive progressive intermittent displacements, supporting means for said table, a reciprocable member, means for reciprocating said member, a cam plate having a cam slot, cam drive means operable by said member engageable in said cam slot for driving said cam plate, means supporting said cam plate for movement between two predetermined positions about a predetermined axis, said cam slot being shaped whereby said cam plate will be oscillated about said predetermined axis in response to reciprocation of said member, releasable means drivingly interconnecting said cam plate and work table during part of an oscillation of said cam plate whereby said work table is displaced by said cam plate one said displacement and further releasable means interconnecting said work table and its supporting means for holding said work table stationary during the remaining portion of said oscillation of said cam plate, said cam drive means being reciprocated by said reciprocable member in a substantially straight path substantially intersecting said predetermined axis.

20. Indexing mechanism as claimed in claim 19 wherein the cam slot has a generally flat S-shape with the ends of the S comprising portions radially of said axis.

21. Indexing mechanism as claimed in claim 19, wherein the means for reciprocating said member comprises power motor means and which mechanism includes means for controlling said motor means and means for controlling said motor means control means.

22. Indexing mechanism for use with a work table to receive progressive intermittent displacements, and which table has supporting means, said mechanism comprising a reciprocable member, means for reciprocating said member, a cam plate having a cam slot, cam drive means operable by said reciprocable member engageable in said cam slot for driving said cam plate, means supporting said cam plate for movement between two predetermined positions, said slot having a generally flat S shape with the ends of the S being generally straight, said shaping facilitating operation of said cam plate to and fro by said cam drive means between said two predetermined positions and said substantially straight ends of said slot providing dwell portions where said cam plate is stationary while said cam drive means moves therein, releasable drive means adapted for drivingly interconnecting said cam plate and work table and releasable means adapted for interconnecting said work table and its supporting means, said releasable means being operable for effecting their interconnections in response to operation of at least one of said reciprocable member and cam driving means while said cam plate is at rest.

References Cited
UNITED STATES PATENTS

| | | | |
|---|---|---|---|
| 2,660,895 | 12/1953 | Waters | 74—822 XR |
| 2,754,700 | 7/1956 | Benjamin et al. | 74—822 |
| 2,826,099 | 3/1958 | Scholin et al. | 74—822 |
| 3,035,461 | 5/1962 | Benjamin et al. | 74—813 XR |

FRED C. MATTERN, JR., Primary Examiner

F. D. SHOEMAKER, Assistant Examiner